Aug. 31, 1965    W. C. BREMNER ETAL    3,203,447
MAGNETICALLY OPERATED VALVE
Filed Oct. 9, 1963    6 Sheets-Sheet 1

INVENTORS
WILLIAM C. BREMNER
ROBERT W. WEINBERG
BY *Lindsey, Prutzman and Hayes*
ATTORNEYS Aug. 31, 1965 W. C. BREMNER ETAL 3,203,447
MAGNETICALLY OPERATED VALVE
Filed Oct. 9, 1963 6 Sheets-Sheet 2

INVENTORS
WILLIAM C. BREMNER
ROBERT W. WEINBERG
BY Lindsey, Prutzman and Hayes
ATTORNEYS INVENTORS
WILLIAM C. BREMNER
ROBERT W. WEINBERG
BY *Lindsey, Prutzman and Hayes*
ATTORNEYS Aug. 31, 1965

W. C. BREMNER ETAL 3,203,447

MAGNETICALLY OPERATED VALVE

Filed Oct. 9, 1963

6 Sheets-Sheet 4

INVENTORS
WILLIAM C. BREMNER
ROBERT W. WEINBERG

BY *Lindsey, Prutzman and Hayes*
ATTORNEYS

INVENTORS
WILLIAM C. BREMNER
ROBERT W. WEINBERG
BY Lindsey, Prutzman and Hayes
ATTORNEYS

United States Patent Office 3,203,447
Patented Aug. 31, 1965

3,203,447
MAGNETICALLY OPERATED VALVE
William C. Bremner, Newington, and Robert W. Weinberg, West Hartford, Conn., assignors to Skinner Precision Industries, Inc., New Britain, Conn., a corporation of Connecticut
Filed Oct. 9, 1963, Ser. No. 314,898
12 Claims. (Cl. 137—595)

This invention generally relates to control devices such as valves and is particularly directed to the provision of an improved magnetically operated valve.

It is a principal object of the present invention to provide a magnetically operated valve having improved operating characteristics.

A further object of the present invention is the provision of an improved magnetically operated valve having extremely low operating power requirements while being stable in both open and closed positions without using external mechanical or electrical energy sources.

A still further object of the present invention is the provision of an improved electromagnetically operated valve wherein the solenoid can be easily removed and replaced without disturbing any fluid connections.

Another object of this invention is the provision of an improved electromagnetically operated valve having a self-contained power source.

An additional object of this invention is the provision of an improved manually actuated valve that eliminates many of the problems attendant to direct mechanical valve actuation.

Another object of this invention is the provision of an improved magnetically operable valve utilizing a minimum number of easily manufactured parts that can be assembled in a facile manner to produce a compact and reliable valve.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
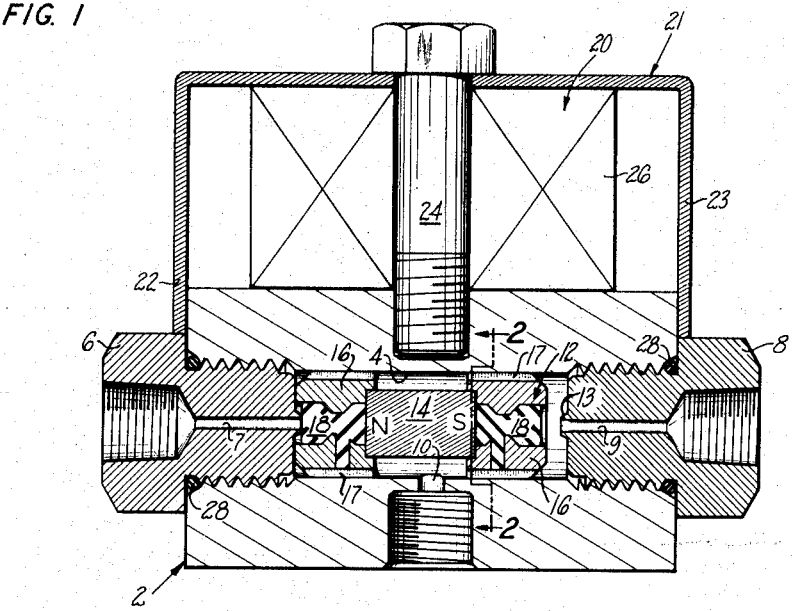
Figure 2:
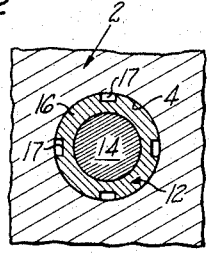
Figure 3:
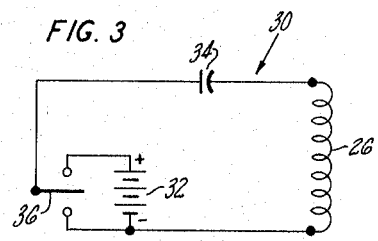
Figure 13:
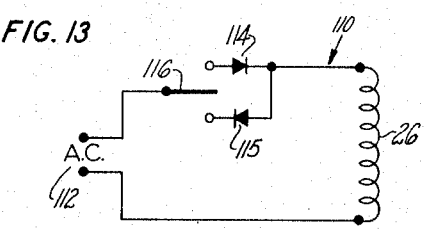
Figure 4:
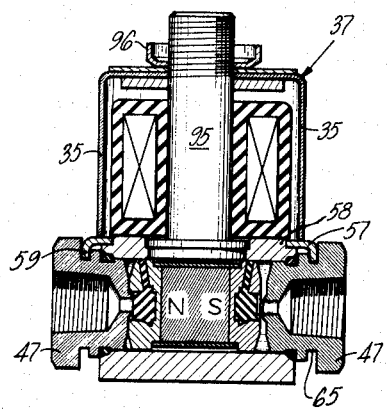
Figure 5:
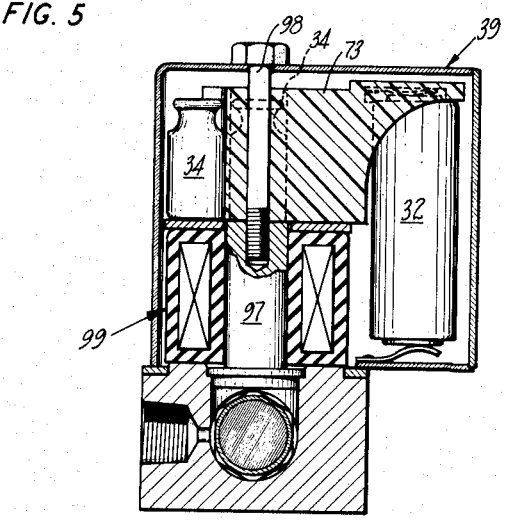
Figure 6:
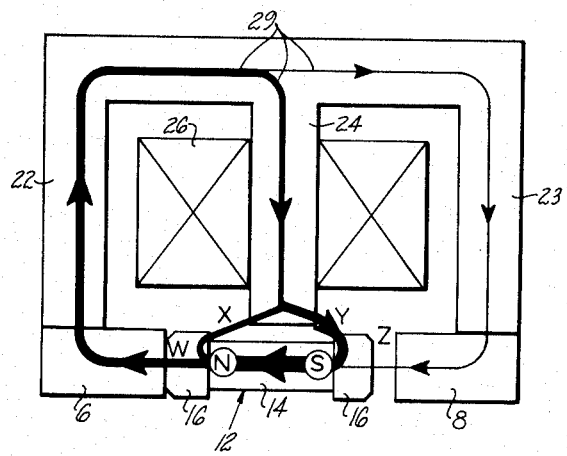
Figure 7:
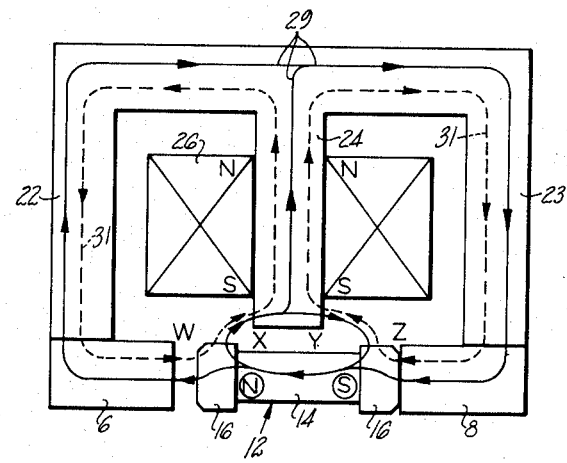
Figure 8:
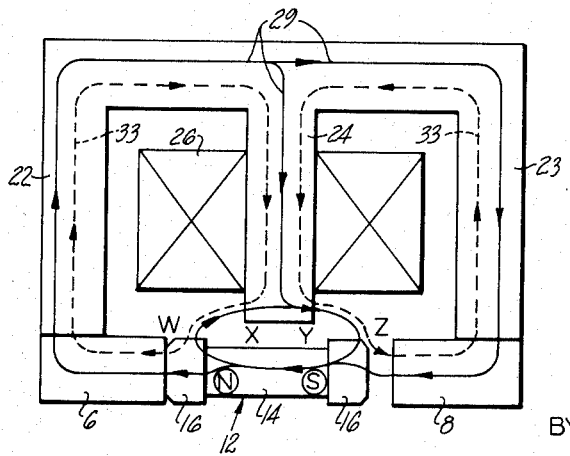
Figure 9:
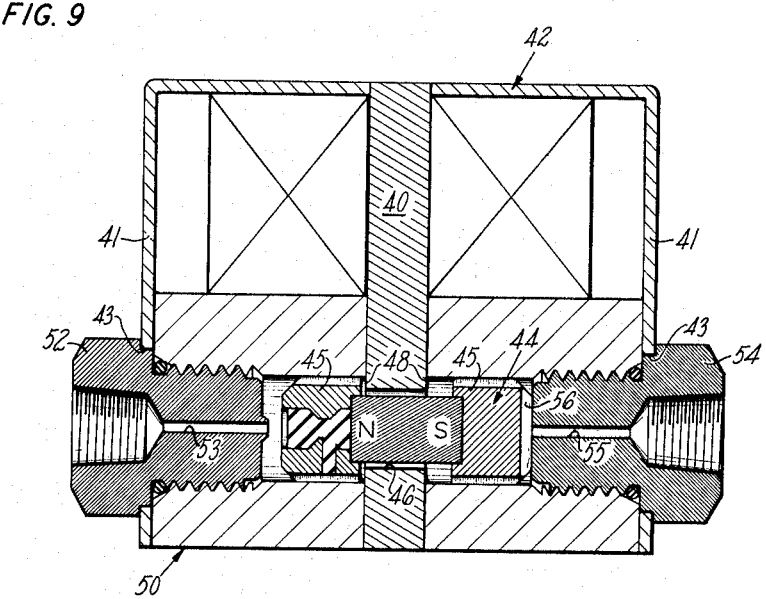
Figure 10:
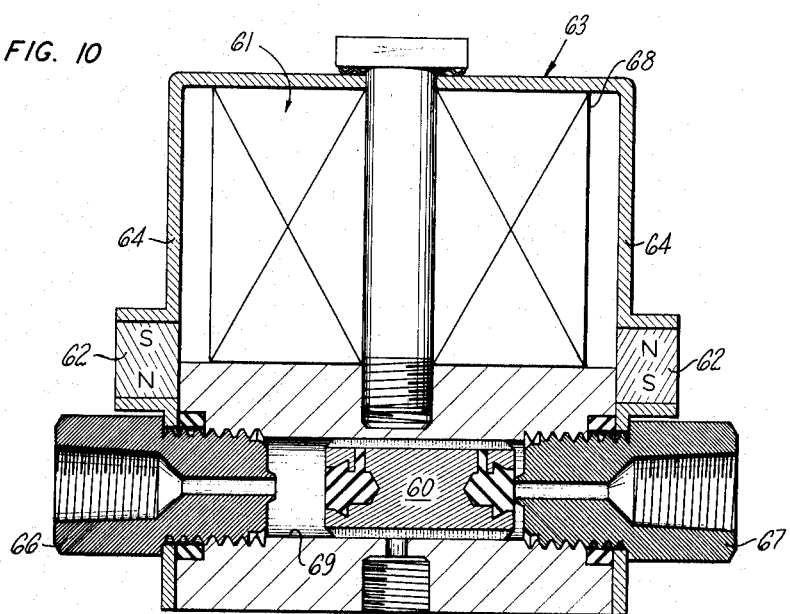
Figure 11:
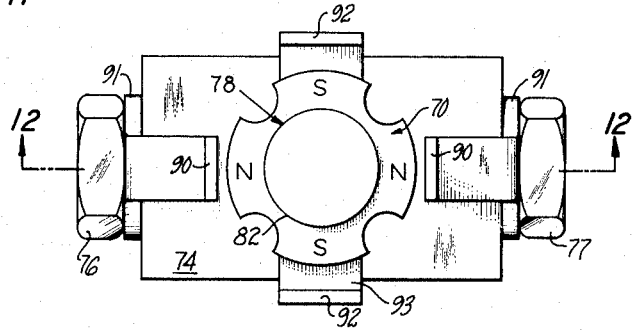
Figure 12:
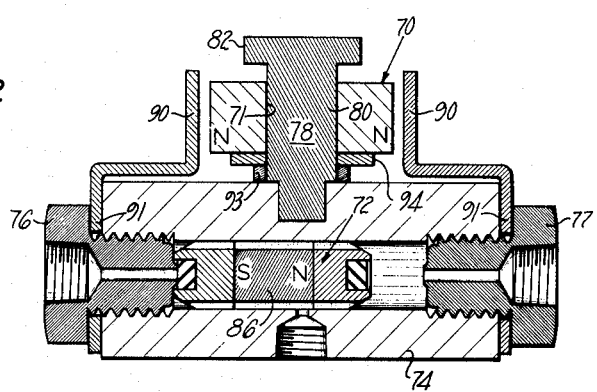
Figure 14:
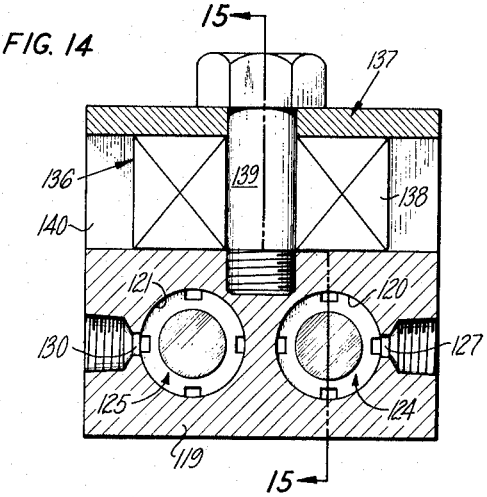
Figure 15:
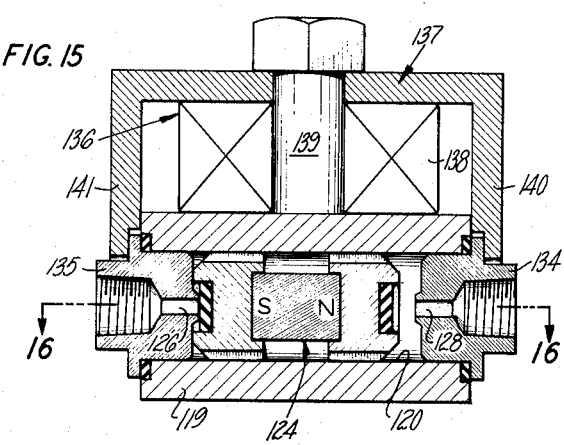
Figure 16:
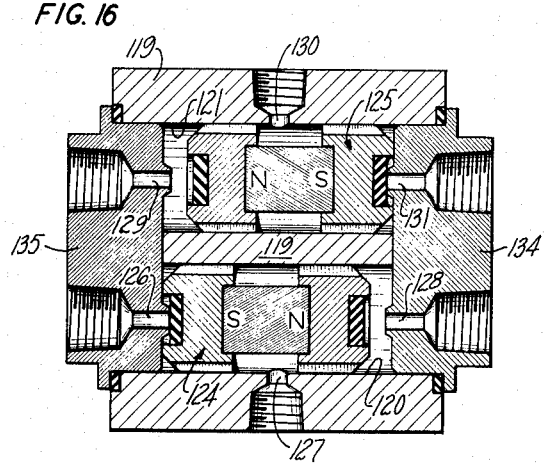

In the drawings:
FIG. 1 is a cross-sectional elevational view of a valve embodying the present invention;
FIG. 2 is a fragmental cross-sectional view taken generally along lines 2—2 of FIG. 1;
FIG. 3 is a schematic view of an actuating circuit for the valve of FIG. 1;
FIG. 4 is a cross-sectional elevational view of modification of the valve of FIG. 1;
FIG. 5 is a cross-sectional elevational view of another modification of the valve of FIG. 1;
FIG. 6 is a diagrammatic view of the valve illustrating a magnetic flux arrangement employed for holding the valve member in its flow-controlling positions;
FIG. 7 is a diagrammatic view similar to FIG. 6 but illustrating the magnetic flux arrangement employed for shifting the valve into one of its flow-controlling positions;
FIG. 8 is a view similar to FIG. 7 but showing the flux arrangement for shifting the valve into the opposite flow-controlling position;
FIG. 9 is a cross-sectional elevational view of another modification of the valve of FIG. 1;
FIG. 10 is a cross-sectional elevational view of a valve representing another embodiment of the present invention;
FIG. 11 is a plan view of a valve representing still another embodiment of the present invention;

FIG. 12 is a cross-sectional view taken generally along lines 12—12 of FIG. 11;
FIG. 13 is a schematic view of an alternative actuating circuit for the valve;
FIG. 14 is a cross-sectional elevational view of a valve representing still another embodiment of the present invention;
FIG. 15 is a cross-sectional view taken generally along lines 15—15 of FIG. 14; and
FIG. 16 is a cross-sectional view taken generally along lines 16—16 of FIG. 15.

Referring to the drawings in detail, FIG. 1 shows a valve constructed in accordance with the present invention including a body, generally designated 2, formed from a suitable nonmagnetic material and having a flow passage 4 extending therethrough. In the opposite ends of the flow passage 4 there are secured screw plugs 6 and 8 formed from a suitable magnetic material. The porting in the valve of FIG. 1 is shown for illustrative purposes only and includes first and second passages 7 and 9 provided in the screw plugs 6 and 8 and opening into the flow passage 4 and a third passage 10 provided in the body 2 in communication with the flow passage 4 intermediate the ends thereof.

Flow between the passages 7, 9 and 10 is controlled by a valve plunger, generally designated 12, slidably received in the flow passage 4 for movement between two positions at the opposite ends thereof as determined by the screw plugs 6 and 8. In one position (shown in FIG. 1) of the valve plunger 12, communication between the passages 9 and 10 is established while the passage 7 is closed and in the opposite position of the valve plunger 12, communication between the passages 7 and 10 is established while passage 9 is closed; the inner faces of the screw plugs 6 and 8 being provided with seats 13 for the valve plunger 12, in the illustrated embodiment. The valve plunger 12 is actuated into these opposite flow-controlling positions and is releasably held therein solely by magnetic forces.

In accordance with the present invention, the valve plunger 12 is provided with a permanent magnet core or center piece 14 formed from any suitable material such as "Alnico VIII" and having a uniform cross section shown as circular in FIG 2. In the preferred embodiment, on the opposite ends of the core 14 there is fixed, such as by brazing, a pair of identical pole pieces 16 formed from a suitable magnetic material. The pole pieces 16 are dimensioned to slidably engage the walls of the flow passage 4 to thereby guide the plunger 12 and further to seat against the inner faces of the screw plugs 6 and 8 to thereby close the passages 7 and 9. Longitudinal grooves 17 are provided in the periphery of the pole pieces so as to convey fluid between passages 7, 9 and 10. Additionally, for improved sealing results, elastomeric seal inserts 18 may be provided in the pole pieces 16 so as to be cooperable with the seats 13 on the screw plugs 6, 8.

In accordance with another aspect of the present invention, there is provided an electromagnet 20 including a core 21 of E-shaped cross section mounted on the body 2 to one side of the flow passage 4 with the legs 22, 23 and 24 of the core 21 extending generally normal to the axis of the flow passage 4; the outer legs 22, 23 straddling the ends of the body 2 while contacting the plugs 6, 8; and the central leg 24 extending into the body 2 midway between the plugs 6, 8 and terminating adjacent the pole pieces 16 of the valve plunger 12.

In the illustrated embodiment, the electromagnetic core 21 is formed by a yoke piece of suitable magnetic material which provides the outer legs 22, 23; and a steel screw which provides the central leg 24 while also serving to secure the electromagnet 20 to the body 2. The electromagnet 20 further includes a wire or coil 26 wound on the central leg 24 of the core above the valve body 2 where it is isolated and may be conveniently removed and replaced. The O-ring seals 28 are preferably provided around the plugs 6, 8 so as to prevent leakage as well as to seal off the coil 26 from the flow media.

An enclosure cap may be provided to cover the electromagnet and referring to FIG. 4, a commercial embodiment of the invention is illustrated wherein the outer legs 35 of the core of the electromagnet are provided by the side walls of a cylindrical enclosure cap 37 thus eliminating the need for a separate yoke piece for the electromagnetic core, as in the above-described embodiment. In the valve of FIG. 4 the outer core legs 35 are connected to the plugs 47 to thereby provide a low reluctance magnetic flux path by means of an apertured base plate 57 which is formed of magnetic material and is received on the valve body around an external flange 58. The base plate 57 has depending from its ends, a pair of ears 59 which are received in grooves 65 provided in the plugs 47 to thereby establish contact with the plugs 47 as well as to hold the same in position in the valve body. The enclosure cap 37 is secured to the valve body on the base plate 57 by a threaded stud 95 and a cooperable nut 96, the screw 95 further providing the central leg of the electromagnet core.

Referring to FIG. 6 in conjunction with the valve of FIG. 1, it will be seen that the permanent magnet 14 produces a flux 29 that extends along the path from the north pole of the permanent magnet to the screw plug 6 through the outer core leg 22 and back to the south pole of the permanent magnet through the central core leg 24 as well as through the outer core leg 23 and screw plug 8. The flux 29 of the permanent magnet additionally extends from the north pole directly to the central core leg 24 and then directly back to the south pole of the permanent magnet. Since the total of the gaps W and Y is less than that of gaps X and Z, the flux densities and thus the attractive forces across gaps W and Y will be greater than that across gaps X and Z. The result will be that the valve plunger 12 will be held against the screw plug 6 under the attractive forces across gaps W and Y.

When it is desired to shift the valve plunger 12 to the opposite flow-controlling position, the electromagnet is pulse-energized with a proper polarity so as to induce a flux 31 (see FIG. 7) that will reinforce the permanent magnet flux 29 across gaps X and Z while opposing the permanent magnet flux 29 across gaps W and Y as denoted by the arrows in FIG. 7. The result will be that the valve plunger 12 will shift to the right (as viewed in the drawings) into the opposite flow-controlling position since the density and therefore the attractive forces across gaps X and Z will be greater than those across gaps W and Y.

In order to maintain the valve plunger 12 in the right-hand flow-controlling position, it is unnecessary to maintain the electromagnet energized since the flux of the permanent magnet across gaps X and Z will become effective to hold the valve plunger 12 against the screw plug 8 upon de-energization of the electromagnet.

Referring to FIG. 8, in order to shift the valve plunger back to the left-hand flow-controlling position the electromagnet is pulse-energized with a polarity opposite to that described above. As illustrated by the arrows in FIG. 8, this will induce a flux 33 that will reinforce the permanent magnet flux 29 across gaps W and Y while opposing the flux 29 across gaps X and Z and thus the valve plunger 12 will shift to the left-hand flow-controlling position against the screw plug 6 under the attractive forces across gaps W and Y. This shifting of the valve plunger 12, as well as that described above, is not only caused by the net attractive forces produced by the combined flux of the permanent magnet and the electromagnet, but is additionally caused by repulsion forces which are produced by the interaction between the flux of the permanent magnet and the electromagnet.

Referring to FIG. 3, there is shown an illustrative electrical circuit 30 for the electromagnet 20, the circuit 30 including a battery source 32, a capacitor 34 in series with the coil 26 of the electromagnet 20 and a double-throw switch 36. The capacitor 34, as included in the circuit 30, provides a simple and efficient method for reversing the energizing current of coil 26 as well as limiting the energizing current to an impulse sufficient for shifting the valve plunger 12.

The electrical actuating circuit with its components may be conveniently provided as a compact power pack, such as illustrated in the modification of the valve shown in FIG. 5, wherein two batteries 32 (only one shown) and three capacitors 34 (only two shown) are utilized. In the valve of FIG. 5, the batteries 32 and capacitors 34 are held in place in an enclosure cap 39 by means of a recessed holder 73. The holder 73 is mounted on the electromagnet 99 by a screw 98 extending through the cap 39 and received in the central leg 97 of the electromagnet core; the screw 98 also providing a portion of the central leg of the electromagnet core. As in the modification of FIG. 4, the outer legs of the electromagnet core in the modification of FIG. 5, are provided by the enclosure cap 39.

Other actuating circuits may be employed and referring to FIG. 13, an alternative circuit 110 is illustratively shown as including an A.C. power source 112 and a pair of opposed parallel rectifiers 114 and 115 arranged to be selectively connected into the circuit by a double throw switch 116 to thereby obtain the desired current direction through the electromagnet coil 26 for shifting the valve plunger. The valve of the present invention as so utilized with an A.C. power source, eliminates the need for "shading" devices typically required in similarly powered conventional solenoid valves.

Thus it will be apparent that the valve construction of the present invention provides for efficient actuation of the valve plunger with a minimum of power since a low reluctance flux path is provided particularly by the close positioning between the pole pieces 16 and the central leg 24 of the electromagnet 20 together with the high permeability of the pole pieces 16. Moreover, the reluctance of the electromagnetic circuit is substantially constant regardless of the position of the valve plunger 12, primarily because the total of the gaps W, X, Y and Z (see FIGS. 6–8) is constant for any position of the valve plunger. Additionally, the interposition of the pole pieces 16 not only serves to protect the permanent magnet 14 from demagnetizing fields but further provides for a greater axial component of driving force to be exerted on the valve plunger 12 for shifting the same. Thus, with these features the present invention not only provides an extremely low power requirement for actuation, but further provides a smooth and quick acting balanced valve plunger that will seat with a minimum of impart but will nevertheless be firmly held in either of its flow controlling positions.

Referring to FIG. 9, the modified valve shown therein is generally the same as that of FIG. 1 except that the central leg 40 of the electromagnet core 42 extends across the valve plunger 44 and is apertured at 46 so as to accommodate the valve plunger 44. This positioning of the portions 48 of the central electromagnet core leg 40 closer to the pole pieces 45 of the valve plunger 44 and to extend around the valve plunger 44, not only increases the axial component of force for shifting the valve plunger 44 but further minimizes side or radially directed forces on the plunger 44 by distributing the central leg flux completely around the periphery of the valve plunger 44.

In the modification of FIG. 9 the electromagnet core 42 is mounted to the valve body 50 through means of the outer core legs 41 and the screw plugs 52, 54 which extend through apertures 43 in the outer core legs 41 to clamp the same against the ends of the valve body 50.

Additionally, the valve of FIG. 9 illustrates another porting arrangement including inlet and outlet passages 53, 55 which are intercommunicated when the valve plunger 44 is in the right-hand position (shown in FIG. 9) and closed from each other when the valve plunger 44 is in the opposite left-hand position. This flow-control arrangement is effected by providing the right-hand pole piece 45 of the valve plunger 44 with a groove 56 that will be in registry with the passage 55 when the valve plunger 44 is in the position shown in FIG. 9 to thereby establish communication between the passages 53 and 55. Of course when the valve plunger 44 is in the left-hand position the passage 53 will be closed by the pole piece 45.

Another embodiment of the invention is shown in FIG. 10 which differs from that of FIG. 1 in that the valve plunger 60 is formed from magnetic material and permanent magnets 62 are externally provided in the outer legs 64 of the electromagnetic core 63.

With the embodiment of FIG. 10 the same end resutls are obtained in that when the electromagnet 61 is de-energized the flux of the permanent magnets 62 will become effective to hold the valve plunger 60 against one of the screw plugs 66, 67. When it is desired to shift the valve plunger 60 to the opposite position the electromagnet coil 68 is energized by an electrical impulse of proper polarity thereby inducing a second magnetic flux which will interact with the permanent magnetic flux to produce a net force of attraction that will shift the valve plunger 60 to the opposite position as limited by one of the plugs 66, 67. Of course when it is desired to shift the valve plunger 60 back to the initial position, the coil 68 is energized with an oppositely directed current impulse.

It will be seen that in the embodiment of FIG. 10 the stationary positioning of the permanent magnets 62 out of the flow passage 69 and sealed off therefrom protects the permanent magnets 62 from demagnetization as may be caused by impact or the harmful effects of certain flow media while at the same time providing convenient access to the permanent magnets 62 for removal and replacement. Additionally, this external placement of the permanent magnets 62 permits them to be of a greater size and therefore strength and to be employed substantially as cast.

The present invention may also be advantageously applied to provide an improved bi-stable valve that may be actuated manually with little effort and without the problems attendant to conventional mechanical actuators. Referring to FIGS. 11 and 12, another such embodiment of the invnetion is shown which differs from that of FIG. 1 in that it includes a manually operable permanent magnet 70 for shifting the valve plunger 72 to its opposite flow-controlling positions. The permanent magnet 70 which is shown as circular and having a central mounting aperture 71, is mounted for rotation on the valve body 74, externally thereof midway between the screw plugs 76, 77.

In the specific embodiment of FIGS. 11 and 12 the mounting of the permanent magnet 70 is effected through means of a stud 78 fixed into the body 74 midway between the plugs 76, 77 and adjacent the valve plunger 72, the stud being formed from magnetic material so as to provide a path of low reluctance for the flux of the permanent magnet 70. The stud 78 has an intermediate cylindrical portion 80 received through the mounting aperture 71 of the permanent magnet 70 and further, an upper flange 82 providing a stop preventing removal of the permanent magnet 70 from the stud 78.

In the instant embodiment the valve plunger 72 is held by magnetic attraction and repulsion in either of its two flow-controlling positions against one of the plugs 76, 77, depending on the angular position of the external permanent magnet 70. When it is desired to shift the valve plunger 72, say to the right as shown in FIG. 12, the external permanent magnet 70 is rotated 90° in either the clockwise or counterclockwise direction so as to reverse the polarity effect of its magnetic flux and this, together with the flux of the internal permanent magnet 86, will be effective to produce net attractive and repulsive forces that will move the valve plunger 72 to the right-hand position (as viewed in FIG. 12) and maintain it therein.

In order to insure that the external permanent magnet 70 will be maintained in its selected positions, a magnetic detent is provided by four latch members 90, 92 formed from magnetic material and angularly spaced 90° from each other around the periphery of the permanent magnet 70 as shown in FIG. 11.

In the specific embodiment, the magnetic latch members 90 are separately formed each with a stepped shape and are respectively secured to the opposite ends of the valve body 74 by the plugs 76, 77, portions of which extend through an aperture in the base 91 of the latch members 90. The other magnetic latch members 92 in the specific embodiment are formed by one generally U-shaped piece 93 secured to the top of the body 74 through means of the stud 78 which extends through an aperture in the latch member 93. A washer 94 formed of nonmagnetic material is interposed on the stud 78 between the permanent magnet 70 and the latch member 93 as best shown in FIG. 12.

Thus, when the external permanent magnet 70 is moved to a position for shifting the valve 72, a magnetic force of attraction between the poles of the external permanent magnet 70 and the latch members 90, 92 will be effective to maintain the external magnet 70 in the selected position against inadvertent movement. A suitable indicator (not shown) may be provided on the top surface of the permanent magnet 70 so as to facilitate the setting thereof for shifting the valve plunger 72 into the desired flow controlling position.

The present invention may easily be incorporated with great advantage into multiway valve units of the type that include a plurality of separate valve members. In this regard FIGS. 14, 15 and 16 show a four-way valve representing another embodiment of the present invention basically similar to the embodiment in FIG. 1 except that two flow passages 120, 121 are provided in the valve body 119 in side-by-side relationship with each passage having a separate valve plunger 124 and 125, respectively. In the shown embodiment the valve plunger 124 is adapted to control flow between the three ports 126, 127 and 128 opening into the passage 120 while the other plunger 125 is adapted to control flow between the ports 129, 130 and 131 opening into the other passage 121.

Other port and passage arrangements may be employed such as that included in a four-way reversing valve, for example. Moreover, three or more valve plungers may be incorporated into the valve body and in various arrangements including that where the valve plungers are positioned in overlying relationship. Convenient access to the valve plungers 124, 125 for reversing their position to provide a desired valving function or for repair and replacement purposes is provided by the magnetic plugs 134, 135 which are removably held in the opposite ends of the flow passages 120, 121 by the outer legs 140, 141 of the electromagnet 136.

The electromagnet 136 as in the above-described embodiment of FIG. 1, includes an E-shaped core 137 and a single coil 138 located around the central leg 139 of the core 137; the central leg 139 being provided by a screw in the specific embodiment. However, the central core leg 139 in the embodiment of FIGS. 14–16 is positioned midway between the flow passages 120 and 121, as shown in FIG. 14.

Thus, it will be readily appreciated that the present invention, as illustrated in the embodiment of FIGS. 14–16, provides a compact multiway valve unit of increased versatility and performance requiring only a minimum of operating power despite the plurality of valve members which are employed.

From the foregoing it will be seen that the present invention provides an improved valve construction for magnetically operated valves wherein all the porting is conveniently located in the valve body so as to be effectively isolated from the actuator components, particularly the electromagnet coil in the solenoid valve embodiments. And yet the present invention provides this feature in a valve of extremely compact construction including a minimum of parts that may be economically manufactured and quickly and easily assembled. It will additionally be seen that the present invention provides a solenoid valve requiring an extremely low energy input for the actuation thereof which may be effected through means of a single coil while at the same time providing a smoothly operable and unattached valve member which will be automatically held in its flow controlling positions upon de-energization of the solenoid.

As will be apparent to persons skilled in the art, various modifications and adaptations of the structure above described will become readily apparent without departure from the spirit and scope of the invention, the scope of which is defined in the appended claims.

We claim:

1. A valve comprising a body member having a flow passage and inlet and outlet ports opening into the flow passage, portions of the body at the opposite ends of the flow passage being formed from magnetic material, a valve member received in the flow passage for movement between a first position at one end of the passage wherein communication between the ports is closed and a second position at the opposite end of the passage wherein communication between the ports is established, permanent magnet means in one of said valve and body members providing a magnetic flux for holding the valve member in either of said positions against said body portions, and a magnet means mounted on the body between the ends and to one side of the flow passage for providing a second magnetic flux in a direction opposite to the first flux for shifting the valve member into said positions.

2. A valve comprising a body member having a flow passage and inlet and outlet ports opening into the flow passage, portions of the body at the opposite ends of the flow passage being formed from magnetic material, a valve member received in the flow passage for slidable movement between a first position at one end of the passage wherein communication between the ports is closed and a second position at the opposite end of the passage wherein communication between the ports is established, a first magnet means in one of the body and valve members providing a first magnetic flux extending between said first and second positions and including the valve member, a second magnet means, and a member formed of magnetic material removably securing the second magnet means to the body on one side of the flow passage and having an inner end received in said body intermediate said first and second positions providing a path for magnetic flux, said second magnet means producing a second magnetic flux effective together with the first magnetic flux to attract and repel the valve member out of one of said positions and into the other of said positions.

3. A device such as a valve and the like comprising a body having a passage and a control member received in the passage and movable between two control positions at the opposite ends of the passage, said body having portions at the opposite ends of the passage formed from magnetic material, a permanent magnet in one of said body and control members providing a first magnetic flux for releasably holding the control member in either of said two positions against said body portions, an electromagnet mounted on the body including a core of generally E-shaped cross section having a central leg and a pair of outer legs extending generally at right angles to the axis of the passage with the outer legs engaging said body portions, a coil positioned around the central leg of the core to one side of the passage such that an electrical impulse supplied to the coil will induce a second magnetic flux effective together with the first magnetic flux to cause attraction and repulsion of the control member out of one of said positions and into the other of said positions depending on the polarity of energization of the coil.

4. A valve comprising a body having a flow passage and inlet and outlet ports opening into the flow passage, said body having plugs formed of magnetic material located in the opposite ends of the passage, a plunger received in the flow passage for slidable movement between first and second positions at the opposite ends of the flow passage as defined by said plugs thereby to control fluid flow through the passage, said plunger including a permanent magnet providing a magnetic flux for holding the plunger in either of said two positions, an electromagnet mounted on the body including a core of E-shaped cross section having a central leg and a pair of outer legs extending generally transverse to the axis of the flow passage with the outer legs engaging said plugs, a coil positioned around the central leg of the core to one side of the flow passage, the central leg of the core having an apertured inner end disposed in the flow passage and receiving the plunger, said electromagnet providing a second magnetic flux effective together with the first magnetic flux to move the valve member out of one of said positions and into the other of said positions depending on the polarity of energization of the coil.

5. A valve as defined in claim 4 wherein the plunger is provided with pole pieces formed of magnetic material on the opposite ends of the permanent magnet respectively, said pole pieces being positioned adjacent the central leg of the electromagnet core on opposite sides thereof.

6. A valve comprising a body having a flow passage and inlet and outlet ports opening into the flow passage, a valve member received in the flow passage for movement between a first fluid control position at one end of the passage wherein communication between the ports is closed and a second fluid control position at the opposite end of the passage wherein communication between the ports is established, a stud formed of magnetic material and having an inner end extending into said body midway between said fluid control positions, means including said valve member and said stud providing a path for magnetic flux, and permanent magnet means for magnetically latching the valve member in either of said fluid control positions, said permanent magnet means including a permanent magnet mounted to the body on said stud for movement between two operator positions for reversing the magnetic flux thereof to thereby shift the valve member into and out of said fluid control positions.

7. A valve comprising a body having an inlet and outlet and a flow passageway extending therebetween, a valve member in said passageway movable from a first position at one end of the passageway to a second position at the opposite end of the passageway to control fluid flow through the passageway, means forming a magnetic flux path extending from the region of said body adjacent the first valve member position to a region of said body adjacent the second valve member position, said flux path including said valve member as a portion thereof, two permanent magnets positioned in said flux path and producing a first flux urging said valve member to one of said positions, and means for selectively producing a second flux in opposition to said first flux to shift said valve member to the other of said positions.

8. A valve comprising a body having an inlet and outlet and a flow passage extending therebetween, a valve member in said passageway movable from a first position to a second position to control fluid flow through the passageway, means forming a magnetic flux path extending between said first and second positions of the valve member and including the valve member, means forming a second magnetic flux path extending transversely to the first flux path at a location intermediate the said positions of the valve member and to one side of the valve body, a permanent magnet positioned in said first flux path and producing a first flux urging said valve member to one of said positions, and means for selectively producing a second flux in said second flux path for shifting said valve member to the other of said positions.

9. A valve comprising a body having an inlet and an outlet and a flow passageway extending therebetween, a valve member in said passageway movable from a first position to a second position to control fluid flow through the passageway, means forming a magnetic flux path extending from the region of said body adjacent the first fluid control position to the region of said body adjacent the second fluid control position, said flux path including the valve member as a portion thereof, a permanent magnet positioned in said flux path and producing a first magnetic flux urging said valve member to one of said fluid control positions, and a second permanent magnet supported on the body and selectively movable for producing a second magnetic flux in opposition to said first flux simultaneously repelling and attracting said valve member out of one and into the other of said fluid control positions.

10. A mechanism for operating valves and the like which includes a body having a passage and a control member in the passage movable between two opposite control positions; the mechanism comprising means forming a first magnetic flux path extending between said first and second positions of the control member and including the control member, means forming a second magnetic flux path extending transversely to the first flux path at a location intermediate the said positions of the control member, a permanent magnet included in said control member producing a first flux urging said control member to one of said positions, and an electromagnet having a core providing said second flux path, said electromagnet being selectively energizable for producing a second flux path in a direction opposite to the first flux thereby to shift the control member to the other of said positions.

11. A valve comprising a body having an inlet and outlet and a flow passageway therebetween, a valve member in said pasasgeway movable from a first position to a second position to control fluid flow through the passageway, said valve body having portions adjacent said valve member positions formed from magnetic material, a permanent magnet positioned in one of said valve and body members so as to produce a first flux urging the valve member into said first position, and means supported on said body and including a member formed of magnetic material extending into the body and terminating therein adjacent the valve member and intermediate said positions thereby to provide a path for magnetic flux, said last-mentioned means selectively producing a second flux in opposition to the first flux to thereby shift the valve member out of said first position and into said second position.

12. A valve comprising a body having a plurality of flow passages and inlet and outlet ports opening into the flow passages, said body having portions at opposite ends of the flow passages formed from magnetic material, a plurality of valve members respectively received in the flow passages for slidable movement between first and second positions at the opposite ends of the passages for controlling fluid flow therethrough, permanent magnet means in said valve members providing a magnetic flux for holding the valve members in either of said positions against said body portions, and a magnet means mounted on the body between the ends and to one side of the flow passages for providing a second magnetic flux for simultaneously shifting the valve members into said positions.

References Cited by the Examiner
UNITED STATES PATENTS

| | | | |
|---|---|---|---|
| 2,346,904 | 4/44 | Carlson | 251—65 |
| 2,811,979 | 11/57 | Presnell | 251—65 |
| 3,120,943 | 2/64 | Donelan | 251—139 |
| 3,134,404 | 5/64 | Ziccardi | 251—65 |

M. CARY NELSON, *Primary Examiner.*

HENRY T. KLINKSIEK, *Examiner.*